United States Patent [19]

Scheifinger

[11] 4,430,328
[45] Feb. 7, 1984

[54] RUMINANT LACTATION IMPROVEMENT

[75] Inventor: Curtis C. Scheifinger, Morristown, Ind.

[73] Assignee: Eli Lilly and Company, Indianapolis, Ind.

[21] Appl. No.: 394,199

[22] Filed: Jul. 1, 1982

Related U.S. Application Data

[63] Continuation of Ser. No. 255,902, Apr. 20, 1981, abandoned.

[51] Int. Cl.³ .................... A61K 37/00; A61K 35/00
[52] U.S. Cl. .................................... 424/177; 424/118
[58] Field of Search .............................. 424/118, 177

[56] References Cited

U.S. PATENT DOCUMENTS 3,794,732  2/1974  Raun .................................... 424/283
3,928,571  12/1975  Raun .................................... 424/118

OTHER PUBLICATIONS

Pankhurst and McGowain, Ellinbank Dairy Research Institute Report, Australia 1978.
The Merck Veterinary Manual, 5th Ed. 1979, pp. 508–511 "Ketosis in Cattle".
Encyclopedia of Animal Care, 12th Ed. 1977, pp. 13–15 "Acetonaemia".
Dzingaite, Chem. Abs. vol. 58, 1756d (1963).
Dzingaite, Chem. Abs. vol. 64, 1729h (1966).

*Primary Examiner*—Sam Rosen
*Attorney, Agent, or Firm*—Charles W. Ashbrook; Arthur R. Whale

[57] ABSTRACT

Glycopeptide antibiotics improve milk production in lactating ruminants.

8 Claims, No Drawings

RUMINANT LACTATION IMPROVEMENT

This application is a continuation of application Ser. No. 255,902 filed Apr. 20, 1981, now abandoned.

BACKGROUND OF THE INVENTION

It is now well established that improvements in feed utilization efficiency and growth promotion in ruminant animals grown for meat production can be achieved by altering the fermentation process which takes place in the rumen. Ruminant animals utilize their food by degrading the carbohydrates contained therein to pyruvate, and metabolizing the pyruvate to volatile fatty acids (VFAs), which include acetate, propionate and butyrate. The VFAs are absorbed from the gut and employed for energy production and in the growth mechanism.

Ruminant animals are capable of utilizing propionate much more efficiently than either acetate or butyrate. Accordingly, some of the agents which increase the efficiency of feed utilization and promote growth in ruminant animals function by increasing propionate production in the rumen at the expense of acetate and butyrate production.

The requirements and objectives of feed utilization of lactating ruminants such as dairy cows differ considerably from those of ruminants raised for meat production. Ruminal VFA production is of course of primary importance, since it relates directly to the normal maintenance of the animal, as well as to the quality and quantity of the milk produced by the animal. In the lactating ruminant, however, energy for lactation is the most limiting factor in milk production. Acetate is required for milk fat synthesis, while propionate is utilized to produce glucose, which in turn is required for lactose synthesis, and also has a minor role in milk fat production. Butyrate is more glycogenic than lipogenic, the lipogenic aspect being indirect since butyrate must first be degraded to acetate units before it can be utilized for long chain fatty acid synthesis, i.e., milk fat.

Accordingly, in order to increase milk production in lactating ruminants, it is necessary to increase propionate production, but not at a large expense of acetate and butyrate production. Significantly reduced acetate and butyrate levels result in drastically reduced milk fat content, thereby rendering milk production less efficient with respect to both quality and economically (bulk milk prices are determined in part by milk fat content).

It has now been found that the glycopeptide compounds which are known to increase the efficiency of feed utilization in ruminants utilized for meat production cause a surprising increase in milk production without an adverse affect on milk quality when administered to lactating animals having a developed rumen function.

The glycopeptides are a known class of compounds which alter ruminant fermentation. The class includes compounds such as actaplanin, avoparcin, ristocetin, vancomycin, A35512, K288, AM374 and A477.

That the glycopeptides are capable of increasing milk production without adversely affecting milk fat content is particularly surprising in view of the fact that other known feed efficiency enhancing agents are incapable of improving ruminant lactation. Pankhurst and McGowan, for example, in a 1978 report from the Ellinbank Dairy Research Institute of Australia, discussed the effects of the polyether feed efficiency enhancer monensin on the milk production of dairy cows. These authors concluded that, while monensin caused an increase in the volume of milk produced, the fat content was significantly reduced, so that fat-corrected-milk production was unchanged.

An object of this invention is to provide a method for improving ruminant lactation such that the volume of milk produced is increased without a concomitant decrease in milk fat content.

SUMMARY OF THE INVENTION

This invention relates to a method for improving milk production in lactating ruminants having a developed rumen function. Such improvement is manifested in increased milk production or increased protein content. The method comprises orally administering to a lactating ruminant a propionate increasing amount of a glycopeptide antibiotic selected from actaplanin, avoparcin, ristocetin, vancomycin, A35512, A477, K288 and AM374. Physiologically acceptable salts and esters of those glycopeptide antibiotics which are capable of forming such derivatives also can be employed in the method of this invention.

The method of this invention can be practiced by formulating a glycopeptide antibiotic for convenient oral administration to a ruminant. The glycopeptides can be formulated as feed pre-mixes, feed additives, licks, water additives, or if desired the active agents can be formulated for slow release over a prolonged period of time following a single administration.

DETAILED DESCRIPTION OF THE INVENTION

The glycopeptide antibiotics employed in the lactation improvement method of this invention are known in the art. The method is preferably carried out employing a glycopeptide selected from avoparcin, A35512, actaplanin, vancomycin, ristocetin or A477. The method is most preferably carried out employing avoparcin, A35512, or actaplanin, and especially actaplanin.

Avoparcin is a complex of water-soluble glycopeptide antibiotics. The complex is comprised primarily of two main components, with several minor components also present. Avoparcin, also identified as AV290, is disclosed and characterized by Kunstmann et al. in U.S. Pat. No. 3,338,786. The use of avoparcin and its derivatives for promoting weight gain in ruminants is described in several references; see Sherrod et al., *Proc. Anim. Meet.-Am. Soc. Anim. Sci., West Sect.*, 1979, 30 (271–274), cf. CA. 92:5270x (1980); Trevis, *Feedstuffs*, 1979, 51(42), 20, cf. C.A. 92:4993y, 1980.

Actaplanin is similar to avoparcin in that it is a complex of glycopeptide antibiotics which are effective in improving feed utilization in ruminant animals such as steers. Actaplanin, as a complex identified as A-4696, was first disclosed by Hamill et al. in U.S. Pat. No. 3,952,095. Individual factors A and B of actaplanin are described in U.S. Pat. No. 4,115,552. The use of actaplanin for increasing the efficiency of feed utilization by ruminant animals is described by Raun in U.S. Pat. No. 3,928,571. more recently, several new factors of actaplanin have been isolated and characterized, as well as a pseudo-aglycone which is common to all of the various factors. The lactation improvement method provided by this invention can be accomplished by employing actaplanin as a complex, or alternatively by employing any of the individual factors or suitable derivatives thereof. Additionally, the method can be practiced by employing the pseudo-aglycone of actaplanin. The term "actaplanin" as used herein will refer to the A-4696 complex and to the individual components and mixtures thereof.

The glycopeptide antibiotic referred to as A-35512 is a complex of related factors. The complex and the various factors which make up the complex, and their use in increasing feed utilization efficiency and promoting growth in animals, is described by Michel et al. in U.S. Pat. No. 4,083,964. The A-35512 factor B aglycone is described by Debono in U.S. Pat. No. 4,029,769.

The glycopeptide ristocetin, and its use as a feed-utilization improvement agent, is described in U.S. Pat. No. 3,928,571. The actual preparation of ristocetin and certain of its derivatives is described in U.S. Pat. No. 2,990,239 and British Pat. Nos. 850,408 and 843,560. Ristocetin has been shown to be the same material known as ristomycin, see Williams et al. *J. Chem. Soc., Chem. Commun.* 1979 (906).

The use of A477 and vancomycin to improve ruminant feed utilization is disclosed in U.S. Pat. No. 3,928,571. Another water-soluble glycopeptide antibiotic which improves ruminant feed utilization is known as K288 and is described in *J. of Antibiotics*, Series A, Vol, 14, p 141 (1961). K288 is also known as actinoidin.

U.S. Pat. No. 3,803,306 teaches the use of the antibiotic AM374, and certain derivatives thereof, as a growth promoter for ruminants raised for meat production.

In accordance with the method of this invention, lactating ruminants such as dairy cows and goats are given a propionate increasing amount of a glycopeptide antibiotic which is known to be effective in increasing propionate production in animals having a developed rumen function. It has been unexpectedly found that the glycopeptide antibiotics thus cause an increase in milk volume produced without a concomitant increase in food consumption, and without a reduction in the quality of the milk produced (i.e. milk fat content). Increased milk protein can also be observed. The practical effect of this invention is to obtain an improved milk production efficiency in dairy animals.

The method of this invention is practiced by orally administering a propionate increasing amount of glycopeptide antibiotic to a lactating animal having a developed rumen function. The glycopeptide antibiotic can be administered by way of the feed or as a feed additive supplement in the normal daily ration of such animals. The compounds can alternatively be added to drinking water, or can be placed in a lick block or the like. If desired, the active ingredients can be formulated with slow release excipients such as waxes, polymers, copolymers, and the like, and administered in the form of a sustained release pellet, capsule, or in some similar slow delivery device.

The specific dosage rate for the glycopeptide antibiotics will vary depending upon the particular antibiotic employed and the specific dosage regime practiced. In general, improved lactation is realized following a dosage schedule approximating that followed for improved feed utilization in steers. For example, milk production in mature lactating ruminants is improved by about four to about ten percent (pounds of milk per day) when a glycopeptide such as actaplanin is administered to the lactating ruminant at a daily dose of about 0.10 mg/kg/day to about 10.0 mg/kg/day. Similarly, lactating ruminants receiving avoparcin at a dose from about 0.05 to about 50 mg/kg daily experience from about four to about ten percent increase in daily milk production. The method of this invention generally will be practiced by orally administering from about 100 to about 1600 mg. of glycopeptide to a ruminant per day. The glycopeptides routinely will be administered at a rate of about 400 to about 800 mg./head/day.

The glycopeptide antibiotics preferably are mixed with conventional dairy feed compositions. Such compositions are then fed to the livestock according to art-recognized methods.

Conventional feeds for dairy animals include various grains and mixtures of grains such as corn and oats, and roughage feeds such as hay, cottonseed hulls, rice hulls, silage, and the like. The glycopeptide antibiotics can be mixed with such feed compositions at a rate of about 30 to about 300 grams per ton of feed (on a dry matter basis).

For commercial utilization of the glycopeptides for improved milk production according to this invention, it is desirable to employ the active ingredients as a feed additive premix or a feed additive concentrate. In such formulations, the glycopeptides are uniformly distributed throughout a conventional organic or inorganic animal feed carrier such as ground corn, barley, soybean meal, wheat, soy flour, or similar low priced edible ingredient. The premix is then mixed uniformly with the normal daily feed ration prior to feeding the lactating ruminant. The premix is added as a rate sufficient for the animal to receive a propionate increasing amount of glycopeptide.

As already pointed out, the glycopeptide antibiotics to be employed in the method of this invention are known in the art and can be prepared by methods familiar to those skilled in the art. An especially preferred method according to this invention employs actaplanin. In addition to the use of the actaplanin complex, which is preferred herein, the individual factors of actaplanin can be employed. Factors A and B are readily available as pointed out hereinabove. In addition to these individual factors, the method can be practiced employing any of newly isolated $B_1$, $B_2$, $B_3$, factors $C_{1a}$, $C_3$, E, G and related factors. These and similar individual factors are fully described in copending applications of Debono and of Weeks.

Since an especially preferred method of increasing milk production comprises administering actaplanin to a lactating ruminant having a developed rumen function, the preparation of the actaplanin complex and certain of the individual factors of actaplanin, as well as the pseudo-aglycone, will be provided in order to further illustrate a preferred aspect of this invention.

EXAMPLE 1

Submerged aerobic cultural conditions are preferred for the production of the antibiotic A-4696 factors. Relatively small amounts of the antibiotics can be produced by shake flask culture; however, for the preparation of large amounts, submerged aerobic culture in sterile tanks is preferred. The culture medium in the sterile tank can be inoculated with a mycelial fragment suspension.

Accordingly, it is desirable to produce a vegetative inoculum of the organism by inoculating a relatively small quantity of culture medium with the mycelial fragments of the organism, and when a young active vegetative inoculum is obtained, to aseptically transfer it to the large tank. The medium in which the vegetative inoculum is grown can be the same as that utilized for large scale production of the antibiotic A-4696 factors, although other media can be employed.

The antibiotic A-4696 factor producing *Actinoplanes missouriensis* strains ATCC 31680, ATCC 31681, ATCC 31682, and ATCC 31683, grow at temperatures between 20° and 40° C. The largest amounts of A-4696 factors appear to be produced at a temperature of about 30° C.

Sterile air is blown through the culture medium in the submerged aerobic culture process. The volume of air sparged into the culture medium varies from about 0.1 to about 1.0 volume of air per minute per volume of culture medium. The most efficient growth and antibiotic production are achieved when the volume of air is at least $\frac{1}{2}$ volume of air per minute per volume of culture medium.

The rate of production of antibiotic A-4696 factors and the concentration of antibiotic activity in the culture medium can be followed during the growth period by testing samples of the fermentation broth for antibiotic activity against organisms known to be susceptible to the antibiotic. One such assay organism useful to illustrate the present invention is *Bacillus subtilis*. The bioassay can be carried out by the standard cup-plate methods, or by the paper disc assay on agar plates.

Generally, maximum production of the antibiotic occurs within about 4 to 6 days in shake flasks or submerged aerobic culture fermentations.

Antibiotic A-4696 for subsequent isolation of antibiotic A-4696 factors $B_1$, $B_2$, $B_3$, $C_{1a}$, $C_3$, and $E_1$ can be isolated from the culture medium and separated from other substances which may be present by adsorptive and extractive techniques. Adsorptive techniques are preferred because such procedures avoid the use of large volumes of solvents required in extraction processes.

Since the procedures for preparing actaplanin are substantially the same when using strains ATCC 31680 (for isolation of antibiotic A-4696 factors $B_2$ and $C_3$), ATCC 31682 (for isolation of antibiotic A-4696 factors $B_1$ and $C_{1a}$), and ATCC 31683 (for isolation of antibiotic A-4696 factors $B_3$ and $E_1$), the use of only ATCC 31682 is presented here for simplicity. Certain procedural differences relating to the production medium and the use of strain ATCC 31683 are also presented herein where appropriate.

A. Shake Flask Fermentation

Mycelial fragments of *Actinoplanes missouriensis*, illustrated here with strain ATCC 31682 for simplicity, were inoculated on a nutrient agar slant having the following composition:

| Ingredient | Amount |
| --- | --- |
| Cerelose | 0.5% |
| Potato dextrin | 2.0% |
| *Nutrisoy flour | 1.5% |
| Yeast extract | 0.25% |
| CaCO$_3$ | 0.1% |
| Agar | 2.0% |

*Nutrisoy flour is obtained from Archer Daniels Midland Company, 4666 Faries Parkway, Decatur, Illinois 62526.

The slant inoculated with ATCC 31682 was then incubated for 6 days at 30° C. The culture does not sporulate so it is necessary to macerate the mycelial mat with a sterile pipette. The macerated mature culture was covered with sterile distilled water and scraped carefully with the pipette or a sterile rod to obtain a mycelial suspension.

The suspension thus obtained was used to inoculate 100 ml. of a sterile vegetative medium having the following composition:

| Ingredient | Amount |
| --- | --- |
| Cerelose | 0.5% |
| Potato dextrin | 2.0% |
| Nutrisoy flour | 1.5% |
| Yeast extract | 0.25% |
| CaCO$_3$ | 0.1% |

The inoculated vegetative medium was grown for 48 hours at 30° C. on a rotary shaker operating at 250 rpm. Ten ml. of the inoculated vegetative medium was inoculated into 100 ml. of a sterile "bump" medium of the following composition.

| Ingredient | Amount |
| --- | --- |
| Cerelose | 0.5% |
| Yeast | 0.25% |
| Nutrisoy flour | 1.5% |
| Corn starch | 2.0% |
| CaO$_3$ | 0.1% |
| Sag 471* | 0.05% |

*silicone antifoam agent available from Union Carbide

The inoculated "bump" medium was incubated for 24 hours at 30° C. with constant shaking on a rotary shaker operating at 250 rpm.

Four-tenths ml. of the "bump" medium was inoculated into 100 ml. portions of a production medium of the composition shown below contained in 500 ml. Erlenmeyer flasks, and sterilized at 121° C. for 30 minutes.

| Ingredient | Amount |
| --- | --- |
| Cerelose | 1.0% |
| Corn starch | 3.5% |
| Sucrose | 3.0% |
| Molasses | 1.5% |
| Yeast | 1.0% |
| Proflo (Cotton seed flour) | 1.0% |
| CaCO$_3$ | 0.2% |
| K$_2$HPO$_4$ | 0.05% |
| (NH$_4$)$_2$SO$_4$ | 0.025% |
| MgSO$_4$.7H$_2$O | 0.5% |
| Sag 471 | 0.03% |

The production fermentation was shaken for about 96 hours at a temperature of 30° C. on a rotary shaker operating at 250 rpm. The pH at the end of the fermentation cycle was about 8.0.

For production of antibiotic A-4696 factors $B_3$ and $E_1$, strain ATCC 31683 was used to prepare the "bump" medium according to the teaching disclosed above. Four-tenths ml. of the strain ATCC 31683 inoculated "bump" medium was inoculated into 100 ml. portions of a production medium of the composition shown below contained in 500 ml. Erlenmeyer flasks, and sterilized at 121° C. for 30 minutes.

| Ingredient | Amount |
| --- | --- |
| Cerelose | 1.0% |
| Yeast | 2.0% |
| CaCO$_3$ | 0.2% |

| Ingredient | Amount |
| --- | --- |
| $K_2HPO_3$ | 0.05% |
| $(NH_4)_2SO_4$ | 0.025% |
| Sag 471 | 0.03% |

The production fermentation was shaken for about 96 hours at a temperature of 30° C. on a rotary shaker operating at 250 rpm. The pH at the end of the fermentation cycle was about 8.0.

B. 40-liter tank fermentation

The preparation of the inoculum proceeded through the incubation of the "bump" medium detailed under section A, above. Twenty-five liters of a production medium as outlined above was sterilized by autoclaving at 121° C. for 30 minutes and charged into a 40 l. capacity fermentation tank. One-hundred ml. of "bump" medium was inoculated into the sterile production medium. The inoculated production medium was allowed to ferment for 4 days at 30° C. The fermentation was aerated with sterile air in an amount of about one-half volume of air per volume of culture medium per minute. The fermenting production medium was agitated with a mixer utilizing an impeller of a proper size and turning at an appropriate rpm to insure adequate mixing of air with the medium. The pH of the culture medium gradually increased from an initial level of about 6.5 to about 8.0 as the fermentation proceeded. The fermentation can be scaled up further by increasing the medium and inoculum in accordance with the ratios and procedures taught hereinabove.

In this way a larger quantity of the fermentation broth can be conveniently produced for isolation of the antibiotic A-4696 factors.

C. Isolation of Antibiotic A-4696

The fermentation broth (3800 l.) prepared according to the above procedure was filtered after the addition of 5% (wt/vol) filter aid (Celite 545). The filter cake was resuspended in deionized water (3600 l.) and the pH of the aqueous suspension was adjusted to pH 10.5 using aqueous sodium hydroxide. The suspended solids were separated by filtration and washed with water. The filtrate and the washings were combined and the resulting solution was acidified with 20% (wt/vol) aqueous sulfuric acid to pH 4.5. The acidic solution was clarified by filtration using 1% filter aid (Celite 545). The clear solution was passed through a column (1.8×5 ft.) containing 350 l. of Amberlite IRA-116 (Na+ form) and the column washed with deionized water (1200 l.). The IRA-116 resin was removed from the column and eluted batchwise at pH 10.5 with an aqueous solution of sodium hydroxide (total 1000 liters). The resin eluate was neutralized (pH 7) with 20% (wt/vol) aqueous sulfuric acid, then washed with three portions of deionized water (150 liters total). The water washes were neutralized and combined with the neutralized eluate. The resulting solution was concentrated and subsequently freeze dried. The preparation of the crude complex varied in color from tan to dark brown.

D. Removal of Salts from Crude Antibiotic A-4696.

The crude complex (1.0 kg) was slowly added with vigorous stirring to deionized water (1.5 liters). The resulting suspension was stirred for twenty minutes and was subsequently neutralized (pH 7) using a 10% aqueous ammonium hydroxide solution. The insoluble antibiotic A-4696 complex was separated by vacuum filtration, washed with deionized water, and freeze dried. The dried, desalted complex was recovered in approximately 80% yield (based on bioactivity).

E. Purification of Desalted Antibiotic A-4696.

The dried, desalted complex (300 g.) was suspended in deionized water (2 liters), and the pH of the suspension was adjusted to pH 2.7 by addition of 3 N aqueous hydrochloric acid. The acidified solution was centrifuged for 40 minutes at 2500 rpm. The supernatant was decanted and loaded on a column (8×85 cm) containing 6 liters of decolorizing resin (Duolite S761). The activity was eluted with deionized water at a flow rate of 30 ml/min. The elution was monitored by thin layer chromatography. The antibiotic A-4696-containing effluent was concentrated (3 mm., 35° C.) to a volume of 3 liters and freeze dried. The decolorized complex was recovered as a white-to-tan solid in approximately 70% yield (based on bioactivity).

F. Isolation of Antibiotic A-4696 Factor $B_1$, $B_2$, $B_3$, $C_{1a}$, $C_3$, and $E_1$ Hydrochloride Salt The dried, decolorized antibiotic A-4696 complex (10 g. prepared according to the procedure outlined above) was dissolved in 100 ml. of deionized water. The resulting aqueous solution was filtered and loaded on a chromatography column (5×100 cm.) containing 2 liters of polyamide (Machery & Nagel SC6). The column was eluted with deionized water and 200–300 fractions (25 ml. each) were collected. The elution was monitored by UV-activity and by thin layer chromatography. Fractions were combined according to TLC identity and freeze dried. For some of the separations it was necessary to double the column length (200 cm.) by using two of the polyamide columns in line. Additional purification was achieved by repeated chromatography.

The procedures outlined in A-F above are followed using strain ATCC 31682, when isolation of antibiotic A-4696 factor $B_1$ and $C_{1a}$ is desired, using strain ATCC 31680 when isolation of A-4696 factor $B_2$ and $C_3$ is desired, and using strain ATCC 31683 when production of factor antibiotic A-4696 $B_3$ and $E_1$ is desired. While other Actinoplanes strains produce the above aforementioned factors, the strains disclosed are preferred for production of the antibiotic A-4696 factors recited herein.

EXAMPLE 2

An alternative method for isolating antibiotic A-4696 factors $B_1$, $B_2$, $B_3$, $C_{1a}$, $C_3$, and $E_1$ as hydrochloride salts using a single *Actinoplanes missouriensis* strains is as follows:

The dried, decolorized antibiotic A-4696 complex (200 mg. prepared from Strain 31683 according to the teaching of Example 1, A-E above) was dissolved in about 2 ml. distilled water. The resulting aqueous solution was filtered and separated by column chromatography using reversed phase adsorbents such as, for example, Li Chroprep$^R$ RP-18* as the stationary phase and aqueous acetonitrile gradients containing triethylamine phosphate as the mobile phase. Although it is understood that those skilled in the art will vary the acetonitrile concentration gradient depending upon the composition of a particular fermentation, a preferred concentration gradient is 10–40%. The column effluent was monitored by UV-activity and fractions containing the individual factors were collected. The acetonitrile was removed by evaporation under high vacuum and the resulting aqueous solutions were freeze dried. The freeze dried chromatography fractions were then redissolved in distilled water, adsorbed on reversed phase adsorbents such as, for example, Sep Pak$^R$ C18 cartridges** and eluted with 50% aqueous methanol. The aqueous solutions containing the individual antibiotic A-4696 factors were evaporated to dryness and was purified antibiotic A-4696 factors were then recovered as dry amorphous solids

*Available from E. Merck, Darmstadt, Germany.
**Available from Waters Associates Inc., Milford, Mass.

EXAMPLE 3

Preparation of Antibiotic A-4696 Pseudo-Aglycone Dihydrochloride Salt

Antibiotic A-4696 complex (2.0 g. prepared according to the teaching of Example 2) was dissolved in 50 ml. of 5% methanolic HCl and refluxed for 70 minutes. The reaction mixture was evaporated to dryness at 35°-40° C. under reduced pressure. The residue was diluted with a small amount of water which resulted in the formation of a solid which was isolated by filtration. The solid was air dried, dissolved in a small amount of methanol and reprecipitated by the addition of acetonitrile until a granular solid formed. The desired product was then filtered, dried, and was shown by high performance liquid chromatography (HPLC) to be a single homogeneous product. The identity and structure of the desired product were confirmed by plasma desorption mass spectroscopy, proton nuclear mass resonance, and elemental analysis.

Antibiotic A-4696 pseudo-aglycone dihydrochloride salt can also be prepared, in accordance with the above teaching, by hydrolysis of individual factors or mixtures of factors contained in the antibiotic A-4696 complex.

EXAMPLE 4

Preparation of Actaplanin factor G

A nutrient agar slant having the following composition was prepared.

| Ingredient | Amount (% by weight) |
|---|---|
| Cerelose | 0.5 |
| Potato dextrin | 2.0 |
| Nutrisoy flour | 1.5 |
| Yeast extract | 0.25 |
| Calcium carbonate | 0.1 |
| Agar | 2.0 |

The slant was inoculated with ATCC 31681 and then incubated at 30° C. for about 6 days. After incubation the mycelial mat on the slant culture was covered with sterile distilled water and scraped loose with a sterile rod or loop to obtain an aqueous suspension of the mycelium.

The aqueous suspension was used as the inoculum for 100 ml. of sterile vegetative medium having the same composition as the agar slant medium described above. The inoculated medium was incubated for about 48 hours at a temperature of about 30° C. During incubation the vegetative medium was agitated on a rotary shaker operating at about 250 rpm. Following the growth of the vegetative medium, 10 ml. of the grown culture was withdrawn and used as the inoculum for sterile bump medium having the following composition.

| Ingredient | Amount (% by weight) |
|---|---|
| Cerelose | 0.5 |
| Yeast | 0.25 |
| Nutrisoy flour | 1.5 |
| Corn starch | 2.0 |
| Calcium carbonate | 0.1 |
| Antifoam agent (Sag 471) | 0.05 |

The bump medium was incubated for about 24 hours at a temperature of about 30° C. while agitated on a rotary shaker at 250 rpm. The grown bump medium was then used to inoculate the A-4696G sterile production medium of the following composition.

| Ingredient | Amount (% by weight) |
|---|---|
| Cerelose | 2.5 |
| Yeast | 2.0 |
| Calcium carbonate | 0.2 |
| Ammonium sulfate | 0.025 |
| Dipotassium acid phosphate | 0.05 |
| Glycerine | 1.5 |
| Molasses | 1.5 |
| Corn starch | 3.5 |
| Antifoam agent (Sag 471) | 0.03 |

The fermentation was carried out for 143 hours at a temperature of about 30° C. with stirring and aeration with sterile air at a rate of about one-half volume of air per volume of culture medium per minute. During the fermentation the pH of the medium increased from an initial pH of about 6.5 to a pH of about 8.0. At the end of the fermentation (about 143 hours) the medium contained about 5,000 units of activity per ml.

A portion (30 liters) of the whole fermentation broth was diluted with 30 liters of acetone and the pH adjusted to 1.8 with 6 N hydrochloric acid. The acidified whole broth was filtered using a filter aid and the insolubles were washed with water on the filter. The pH of the filtrate was adjusted to 3.5 with 150 ml. of 50% sodium hydroxide and the filtrate concentrated in vacuo to a volume of 29 l. The pH was readjusted from 2.2 to 3.1 with sodium hydroxide and refiltered to remove insolubles. The filtrate containing the antibiotic was passed over a 3-inch diameter column containing 5 liters of Mitsubishi Dianion HP-20 non-functional resin (styrene-divinylbenzene resin) pretreated with methyl alcohol and washed with water. The flow rate was 250 ml/min. After adsorption of the antibiotic on the resin, the column was washed with 5 liters of water and eluted successively with 21 liters of 21% aqueous methyl alcohol, 15 liters of 50% aqueous methyl alcohol, and 15 liters of 50% aqueous acetone. Four-liter fractions of wash and eluate were collected. Fractions 8, 9 and 10 contained the majority of the antibiotic activity and was also free from most of the impurities. Fractions 8, 9 and 10 were combined and concentrated to a volume of 6 liters under vacuum. After the pH of the concentrate was adjusted to pH 6.8 with aqueous sodium hydroxide, the concentrate was poured into 60 liters of iso-propyl alcohol. A-4696G precipitated from the diluted concentrate and was filtered and dried. There were obtained 54.2 g. of A-4696G in substantially pure form. The A-4696G obtained was further purified by HPLC.

A-4696G free base is dissolved in methyl alcohol and the solution diluted with 1 N hydrochloric acid. After stirring the acidified solution is diluted with acetone to precipitate the A-4696G dihydrochloride salt.

EXAMPLE 5

That administering a propionate increasing amount of a glycopeptide antibiotic to a lactating ruminant having a developed rumen function manifests an improved nutritional response in the form of increased milk production without a concomitant adverse reduction in milk composition has been demonstrated in several in vivo studies. One such study involved in the use of eight lactating Holstein cows. The cows were divided into two groups of four. For the first five weeks of a fifteen week test, one group of four animals were given a normal feed ration of grain and hay, with water available ad libitum, plus a non-medicated feed additive. The second group of four animals were given the same feed and water ration, plus a daily dose of actaplanin (complex) at 360 mg per head in the form of a feed additive.

During the second five week period of the test, the four animals which received actaplanin during the first five weeks were given feed and water only, whereas the animals which were untreated during the first five week period received a daily dose of 360 mg per head of actaplanin plus the normal ration of feed and water. For the final five weeks of the test, the animals were treated as they were during the first five weeks.

Milk production and milk composition from each animal were monitored daily throughout the fifteen week test. The change in weight of each cow was also determined at the end of the test. The daily milk production and composition for the animals receiving actaplanin were averaged and are denoted below in Table I as the "Treated Group." The animals receiving no actaplanin during the designated test periods are denoted the "Control Group." The results of the test are presented in Table I.

TABLE I

|  | Milk Production lbs/day | Milk Fat % | Milk Protein % | Animal Weight lbs. |
|---|---|---|---|---|
| Control Group | 39.35 | 3.24 | 3.05 | 1311 |
| Treated Group | 40.95 | 3.24 | 3.13 | 1313 |

The results of the test demonstrate that actaplanin at a daily dose of 360 mg/head causes a nutritional response in lactating ruminants which is manifested in an increase in milk production of about four percent (by weight). Such increase in milk output is effected without a concomitant decrease in butter fat content of the milk. Moreover, the protein content of the milk produced by lactating ruminants receiving a glycopeptide antibiotic does not differ significantly from that of untreated animals. Additionally, treated animals had no significant change in body weight.

A similar study was conducted using twenty-four lactating Holstein cows assigned to a twelve week switchback evaluation. The animals were divided into four groups of six cows each (Groups A, B, C and D), and all animals received a normal daily ration of feed and water throughout the study. For the first three weeks of the test, the four groups of six animals each received actaplanin as follows: Group A received no actaplanin; Group B received 200 mg/head/day; Group C received 400 mg/head/day; Group D received 800 mg/head/day. During the second three week period, each group was divided into three additional groups of two animals each. The original Group A animals were dosed as follows: 2 cows received 200 mg/head/day; 2 cows received 400 mg/head/day; 2 cows received 800 mg/head/day. The original Group B animals were dosed as follows: 2 cows received 0 mg/head/day; 2 cows received 400 mg/head/day; 2 cows received 800 mg/head/day. The Group C animals were dosed as follows: 2 cows received 0 mg/head/day; 2 cows received 200 mg/head/day; 2 cows received 800 mg/head/day. The original Group D animals were dosed as follows: 2 cows received 0 mg/head/day; 2 cows received 200 mg/head/day; 2 cows received 600 mg/head/day.

During the third three week period of the study the dosing of the animals was switched so that each animal received actaplanin according to its treatment during the first three week period. Similarly, the treatment during the final three week period was the same as that for the second three week period. This switchback dosing is summarized below:

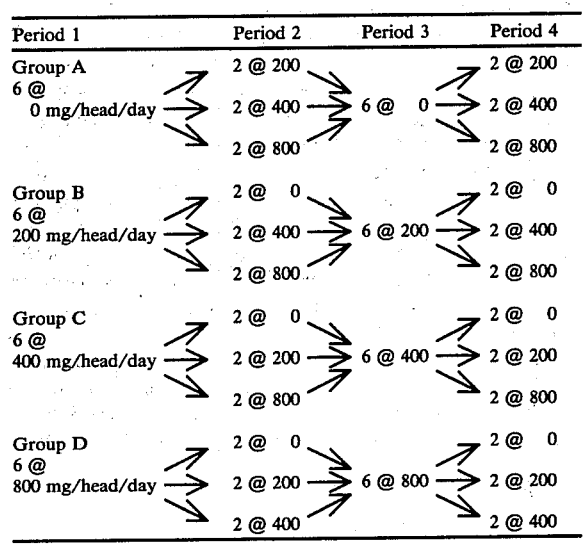

Daily milk production and milk composition was analyzed as before. The results of the test are presented below in Table II as averages for each of the treated groups.

TABLE II

| Treatment Actaplanin mg/head/day | Milk Production lbs/day | Milk Fat % | Milk Protein % | Weight Gain lbs |
|---|---|---|---|---|
| 0 | 43.9 | 3.93 | 3.27 | 11 |
| 200 | 43.9 | 3.94 | 3.28 | 17 |
| 400 | 44.5 | 3.98 | 3.29 | 19 |
| 800 | 46.6 | 3.85 | 3.33 | 18 |

The data demonstrate that actaplanin given to lactating cows effects an observable increase in milk production without a major adverse affect on milk quality. Also, actaplanin causes no substantial change in the weight gain of dairy animals compared to those receiving no glycopeptide.

A third study was carried out employing sixty-four Holstein cows. As the test animals calved, they were assigned to sixteen blocks of four cows per block. Within each of the sixteen blocks, a random order of four treatments were assigned, said treatments being 0, 400, 800, and 1200 mg of actaplanin per head per day.

Three weeks after calving, the test animals began a two week preliminary period during which all animals received a daily ration of feed and water, with no glycopeptide being administered. All cows were fed corn silage, grain and hay cubes in the proportion of 50:30:20 on a dry matter basis at the rate of 2.95 percent of body weight. After the preliminary two week period, cows began receiving their assigned treatments. The test animals received their respective treatments for eight weeks, and then one half the cows on each treatment were switched to control while the other half remained on their assigned treatment. At the end of twelve weeks, those animals that were switched after eight weeks on treatment were removed from the test. The remainder of the test animals received treatment for the full term of lactation.

The results of the test are presented in Tables III-V. The data are approximate least squares means for the eight week period, for a six month test period, and for full lactation periods.

Milk production results in pounds per day are presented in Table III for the eight week, six month and full lactation periods. The data demonstrates that the cows receiving actaplanin during an eight week period of lactation produced from 2.9 to 4.1 pounds more milk per day than nontreated control cows. This amounts to about a 6.0 to about an 8.4 percent increase in milk volume produced as a result of glycopeptide administration. Milk production differences between 0, 400, and 800 mg. actaplanin remained similar for six months and full lactation. The difference in production between nontreated controls and cows receiving 1200 mg. actaplanin increased to 5.1 pounds per day at six months, a 12.2 percent increase, and increased further to 5.7 pounds per day at full lactation, a 14.8 percent increase. Although actual differences in production between 0, 400 and 800 treatments were approximately the same at eight week, six month and full lactation, the probability levels of these differences increased with advancing lactation. Loss of statistical significances between control and actaplanin treated groups was the result of a 34 percent increase in the standard error with full lactation data, indicating that production during the last three months of full lactation was highly variable.

Table IV presents milk fat percentage data for the three time periods and for the various treatment groups. Data are presented for milk fat content of milk obtained in morning milking (AM) and in evening milking (PM). In AM milk samples, small nonsignificant changes occurred in milk fat content between the control group and the treatment groups receiving 400 and 800 mg/head/day of actaplanin. A consistent nonsignificant depression in milk fat occurred (relative to controls) in the AM samples from cows receiving 1200 mg/head/day of actaplanin. For PM milk samples, differences in milk fat percent between 0, 400 and 800 mg. actaplanin groups were greater than occurred in AM milk samples, but the differences were not significant. At each time period for PM milk samples, milk fat percent from cows receiving 1200 mg/head/day actaplanin was lower than that from control cows ($p<0.05$).

TABLE IV

Milk Fat Percent of milk from cows receiving treatment for eight weeks, six months and full lactation

| Time period of test | Time of milking | Level of actaplanin administered (mg/head/day) | | | |
|---|---|---|---|---|---|
| | | 0 | 400 | 800 | 1200 |
| 8 weeks | AM | 3.02 | 3.06 | 3.00 | 2.82 |
| | PM | 3.99 | 3.90 | 3.79 | 3.53 |
| 6 months | AM | 3.04 | 3.02 | 3.07 | 2.90 |
| | PM | 4.02 | 3.71 | 3.89 | 3.58 |
| full lactation | AM | 3.05 | 3.02 | 3.08 | 2.88 |
| | PM | 4.00 | 3.80 | 3.84 | 3.59 |

In dairy research, a common method of expressing milk production is the term "4% fat-corrected milk" (FCM). This term equalizes milk production with differing fat percent on an energy basis. Using the six-month data from Table IV, FCM (pounds/day) produced by cows receiving 0, 400, 800 and 1200 mg/head/day actaplanin was 40.4, 41.1, 42.7 and 42.3 respectively. This translates into a 1.7 percent increase in milk production (over nontreated controls) by cows receiving 400 mg/head/day actaplanin, a 5.7 percent increase from cows receiving 800 mg/head/day, and a 4.7 percent increase from cows receiving 1200 mg/head/day.

That dairy cows receiving a glycopeptide propionate enhancer do not manifest an increased feed utilization efficiency in the form of added weight is shown by the data in Table V. The data represent average daily feed intake and total body weight for control animals and treated animals through a term of full lactation.

TABLE III

Milk Production (in pounds of milk per day) of Cows Fed Actaplanin for Eight weeks, Six months and Full Lactation

| Time Period | Oral Administration of Actaplanin (mg/head/day) | | | | S.E.[a] |
|---|---|---|---|---|---|
| | 0 | 400 | 800 | 1200 | |
| 8 weeks | 48.6 | 52.0 ($p < 0.02$) | 52.7 ($p < 0.007$) | 51.5 ($p < 0.06$) | 0.97 |
| % increase over control | 0 | 7.0 | 8.4 | 6.0 | |
| 6 months | 41.9 | 44.4 ($p < 0.08$) | 45.4 ($p < 0.02$) | 47.0 ($p < 0.002$) | 0.94 |
| % increase over control | 0 | 6.0 | 8.4 | 12.2 | |
| Full lactation | 38.5 | 40.7 ($p < 0.24$) | 41.2 ($p < 0.16$) | 44.2 ($p < 0.008$) | 1.28 |
| % increase over control | 0 | 5.7 | 7.0 | 14.8 | |

[a] Standard Error of least-square mean (approximate)

note:
Data for 8 weeks are based on 16 cows per treatment, except for the control group which had 14 cows due to the removal of 1 cow because of a crippling injury, and due to the removal of 1 cow from the statistical analysis because of being an outlier. The 6 month and full lactation data are based on 8 cows per treatment and 7 cows for control.

TABLE V

Average daily feed intake and body weight

| Parameter (in pounds) | Level of Actaplanin administered (mg/head/day) | | | |
|---|---|---|---|---|
| | 0 | 400 | 800 | 1200 |
| Corn silage-concentrate | 50.7 | 50.4 | 51.5 | 50.1 |
| Alfalfa hay | 7.4 | 7.1 | 7.6 | 7.2 |
| Body weight | 1143 | 1160 | 1145 | 1168 |

Another test was carried out to determine the comparative activity of glycopeptides and their persistency in altering milk production. Holstein cows were assigned as they calved to blocks of four cows each. Within each block a random order of treatments was assigned. A nine-week study was started two weeks following calving. All cows underwent a one week preliminary period during which they received corn silage-concentrate, grain, hay and water. During the following eight week period, in addition to the normal feed ration, one group of six animals received no treatment (controls), another group of six animals received 600 mg/head/day actaplanin, and a third group of six cows received 600 mg/head/day of glycopeptide A35512B. Average daily milk production, milk composition, and persistency of milk production were analyzed. The data in Table VI are the averages for the daily determinations for the entire nine week trial period. The table reports average milk production and milk composition of nontreated controls and treated groups. The persistency values were calculated by dividing the average milk production during the eight week treatment period by average production during the preliminary non-treatment period. Persistency values express how well the treatment groups performed after initialization of treatment compared to performance before treatment initialization. Normal persistency for the trial was expected to be about 94 to about 96 percent. All treatment groups had higher persistencies, thus indicating an observable response to treatment even during a short term.

The analysis of milk composition reported in Table VI demonstrates that milk fat is lowered slightly in treated groups compared to non-treated controls, whereas protein content may be enhanced (in the case of A35512B). Increasing milk protein is an especially desirable response since even a small increase would significantly increase the amount of cheese that could be made from the milk.

TABLE VI

| Treatment | Milk Produced (pounds/day) | Persistency (%) | Milk Composition | | |
|---|---|---|---|---|---|
| | | | Fat (%) | Protein (%) | Solids (%) |
| Control | 55.3 | 95.6 | 3.52 | 3.29 | 11.57 |
| actaplanin (600 mg/head/day) | 52.9 | 99.9 | 3.47 | 3.27 | 11.55 |
| A35512B (600 mg/head/day) | 56.0 | 99.4 | 3.36 | 3.36 | 11.44 |

The data thus generated and presented in the above Tables demonstrate that a glycopeptide antibiotic administered to lactating ruminants having a developed rumen function increases propionate production to such an extent that a significant increase in the amount of milk produced is observed. Moreover, the increase in propionate is not at the expense of acetate and butyrate to such an extent that the levels of milk fat and milk protein are adversely affected.

The practice of the present invention therefore provides for a significant economic improvement in milk production. The method for improving milk production in lactating ruminants provided by this invention provides for improved fat-corrected-milk volumes, as well as improvements in milk composition, including protein content.

I claim:

1. A method for improving milk production in healthy lactating ruminants having a developed rumen function comprising orally administering a propionate increasing amount of a glycopeptide antibiotic.

2. The method of claim 1 wherein the lactating ruminant is a dairy cow.

3. The method of claim 2 wherein the glycopeptide employed is selected from actaplanin, avoparcin, A35512, A477, AM374, ristocetin, vancomycin, and K288.

4. The method of claim 3 wherein the glycopeptide employed is actaplanin, avoparcin, A35512, vancomycin, ristocetin or A477.

5. The method of claim 4 wherein the glycopeptide employed is actaplanin, avoparcin or A35512.

6. The method of claim 5 wherein the glycopeptide employed is actaplanin.

7. The method of claim 5 wherein the glycopeptide employed is avoparcin.

8. The method of claim 5 wherein the glycopeptide employed is A35512.

* * * * *

REEXAMINATION CERTIFICATE (596th)
United States Patent [19]
Scheifinger

[11] B1 4,430,328
[45] Certificate Issued Nov. 25, 1986

[54] RUMINANT LACTATION IMPROVEMENT

[75] Inventor: Curtis C. Scheifinger, Morristown, Ind.

[73] Assignee: Eli Lilly and Company, Indianapolis, Ind.

Reexamination Request:
No. 90/000,836, Aug. 16, 1985

Reexamination Certificate for:
Patent No.: 4,430,328
Issued: Feb. 7, 1984
Appl. No.: 394,199
Filed: Jul. 1, 1982

Related U.S. Application Data

[63] Continuation of Ser. No. 255,902, Apr. 20, 1981, abandoned.

[51] Int. Cl.$^4$ .............................................. A61K 37/10
[52] U.S. Cl. ........................................ 514/8; 424/118
[58] Field of Search ............................ 424/118; 514/8

[56] References Cited
U.S. PATENT DOCUMENTS 3,816,618  6/1974  Raun .
3,928,571  12/1975  Raun .
4,206,203  6/1980  Ingle et al. .

FOREIGN PATENT DOCUMENTS

2137087-A          United Kingdom .

OTHER PUBLICATIONS

Merck Veterinary Manual, 5th edition, 1977, pp. 508–511.
McCullough, "Optimum Feeding of Dairy Animals," 1973, U. Georgia Press, Athens, Ga., pp. 64–70 and 115–121.
Ruan, File History of U.S. Pat. No. 3,928,571 (Ser. No. 442,541), Amendments, Sep. 3, 1974.
Raun, File History of U.S. Pat. No. 3,928,571 (Ser. No. 442,541), Response After Final Rejection, Jan. 17, 1975.
Lemenager et al., *J. Anim. Sci.* 47 247 (1978).
Rennick et al., Abstract 683, 72nd Annual Meeting Am. Soc. Anim. Sci., Jul. 27–30, 1980, Cornell.
Dinius et al., *J. Anim. Sci.* 42: 229 (1976).

*Primary Examiner*—Sam Rosen

[57] ABSTRACT

Glycopeptide antibiotics improve milk production in lactating ruminants.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2–8, dependent on an amended claim, are determined to be patentable.

1. A method for improving *commercial* milk production in healthy lactating ruminants having a developed rumen function comprising orally administering a propionate increasing amount of a glycopeptide antibiotic *to a ruminant throughout the full term of lactation.*

* * * * *